United States Patent [19]

Nielsen

[11] Patent Number: 4,635,683
[45] Date of Patent: Jan. 13, 1987

[54] VARIABLE FORCE SOLENOID

[75] Inventor: Arnold D. Nielsen, Wayne, Mich.

[73] Assignee: Ford Motor Company, Dearborn, Mich.

[21] Appl. No.: 783,393

[22] Filed: Oct. 3, 1985

[51] Int. Cl.$^4$ .................. F16K 31/02; F15B 13/044
[52] U.S. Cl. .................. 137/625.65; 251/129.08; 251/129.15; 251/129.18; 335/274
[58] Field of Search ............. 137/625.65; 251/129.08, 251/129.15, 129.18, 337; 335/258, 273, 274, 278

[56] References Cited

U.S. PATENT DOCUMENTS

| | | | |
|---|---|---|---|
| 3,521,854 | 7/1970 | Leiber et al. | 335/274 X |
| 3,805,203 | 4/1974 | Deckard | 335/258 X |
| 3,880,476 | 4/1975 | Belart et al. | 137/625.65 X |
| 4,299,252 | 11/1981 | Reinicke | 137/625.65 X |
| 4,463,332 | 7/1984 | Everett | 335/258 |
| 4,525,695 | 6/1985 | Sheng et al. | 335/274 X |
| 4,535,816 | 8/1985 | Feder et al. | 137/625.65 |

FOREIGN PATENT DOCUMENTS 3144362 5/1983 Fed. Rep. of Germany ............. 137/625.65

Primary Examiner—Gerald A. Michalsky
Attorney, Agent, or Firm—Frank G. McKenzie; Donald J. Harrington

[57] ABSTRACT

A variable force solenoid for operating a hydraulic pressure regulating valve which includes an actuator shaft aligned with the central axis of the valve and solenoid, a coil of electrical conducting wire, a cylindrical core on which the wire is wound and through which the induced magnetic flux flows, an actuator actuates shaft spaced by a non-working air gap from the casing and moveable axially toward and away from the edge of the core, flexible bearings at opposite axial ends of the actuator shaft and a compression spring. A force is applied to the actuator shaft by a unique double spring combination. The flexible bearings restrict lateral displacement of the actuator and permit frictionless axial displacement of the actuator. The hydraulic valve has a valve spool that moves due, to the position of the actuator, from a position that produces maximum pressure when the coil is de-energized to a position that produces zero pressure when the coil is energized. A zero pressure adjustment and maximum pressure adjustment establish the correct position of the valve spool within the valve body.

27 Claims, 7 Drawing Figures

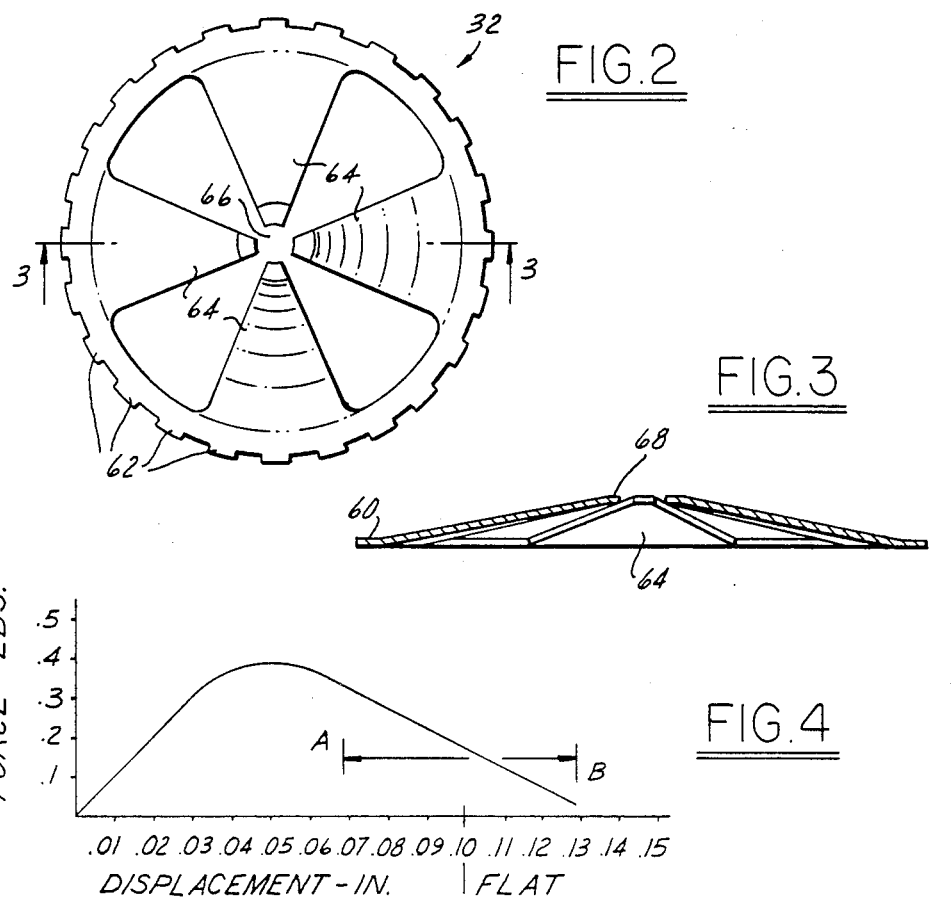
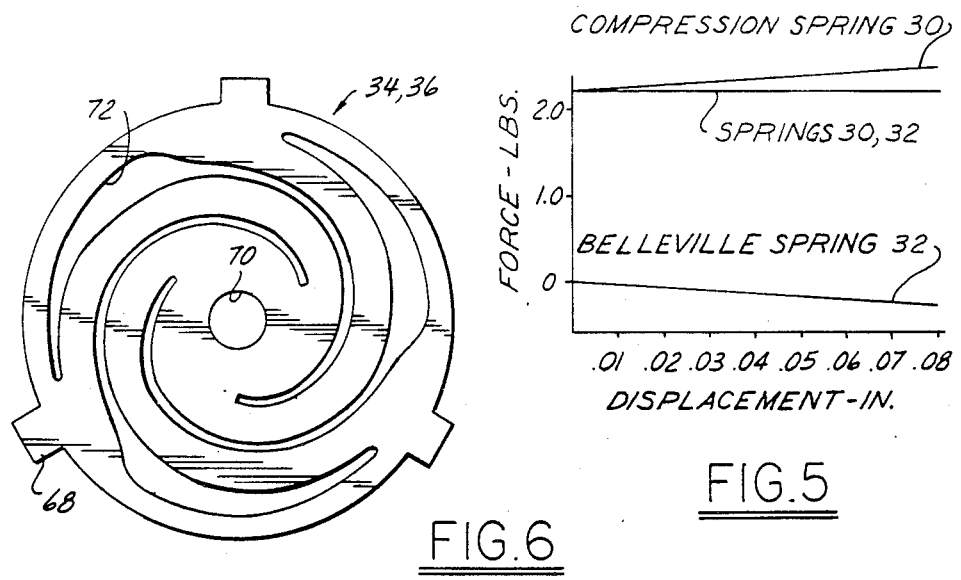

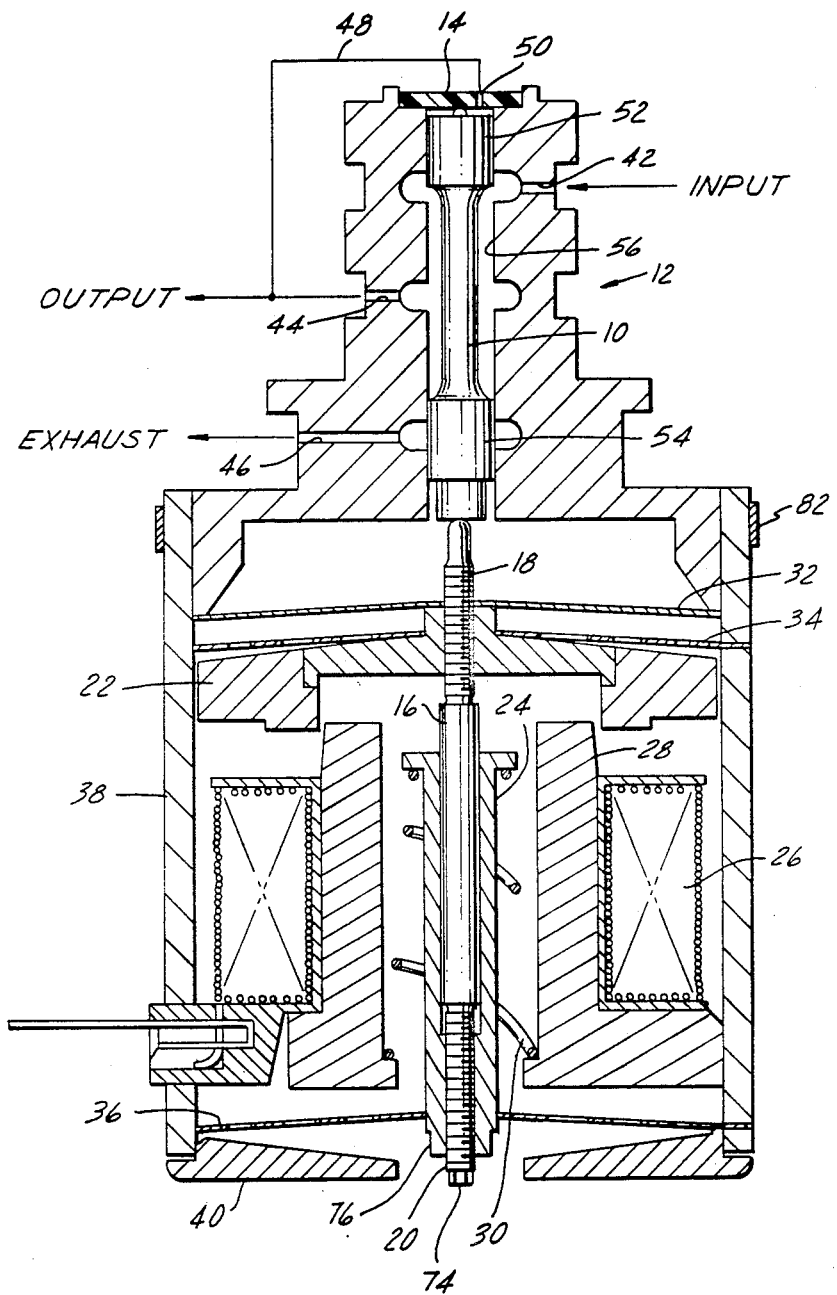

VARIABLE FORCE SOLENOID

BACKGROUND OF THE INVENTION

1. Field of the Invention

This invention relates to the field of electrical solenoids and more particularly pertains to solenoids that control the operation of a hydraulic valve through the application of a force whose magnitude varies with the magnitude of electrical current through the solenoid coil.

2. Description of the Prior Art

In electrical solenoids of the type used currently, when the coil is energized, induced magnetic flux passes in a magnetic circuit that includes a non-working air gap and conductive metal. The configuration of the working air gap determines in part the magnitude of the force produced by the magnetic field in relation to the current in the coil and applied to an actuator. When such a solenoid is used to produce a force that is proportional to current only and independent of the position of the actuator, the force produced is a function of the magnetomotive force (MMF) of the working air gap and the rate of change of the air gap permeance per unit change in the effective air gap. The permeance change includes not only the working air gap but also the radial leakage effects between the plunger and the outer shell.

It is difficult to evaluate analytically the magnitude of the force because the working gap MMF is dependent on the permeability of the metal part, which changes with flux density. Furthermore, the change in air gap permeance changes in a complicated way that can be expressed only graphically.

A variable force solenoid for regulating pressure so that the regulated pressure is proportional to the current in the coil of the solenoid requires that the coil resistance be limited by the minimum battery voltage available. For example, if the solenoid is to be mounted in a transmission wherein the operating temperatures can approach 300° F., and if the full scale current is to be 1 amp., the resistance of a coil is limited to approximately 500 ohms at room temperature, or 9 ohms at elevated temperature. Therefore, because the number of ampere turns of the coil is restricted, to obtain sufficient force from the solenoid, the design must be efficient.

A variable force solenoid must produce a force on the plunger or actuator element that varies only with the coil current and not with the displacement of the actuator. This requires that the correct relationship be established between the MMF of the working air gap and the change in the air gap.

SUMMARY OF THE INVENTION

The variable force solenoid of this invention uses both a compression spring and a modification of a Belleville spring to apply oppositely directed forces to the actuator or plunger. These springs maintain the valve spool in the position that corresponds to the magnitude of electrical current in the solenoid coil. Whereas, in the prior art where a single compression spring is used for this purpose and the spring force varies in magnitude according to the hydraulic flow rate, here the combined effect of the springs is to produce a spring force on the valve spool that is substantially invariant over its entire displacement range. In this way, the output pressure of the hydraulic valve is independent of the hydraulic flow rate because the spring force applied to the valve spool is constant regardless of the flow rate.

The solenoid of this invention has a first adjustment for establishing the position of the valve spool at the maximum pressure position when the coil is de-energized and a second adjustment for establishing the position of the valve spool in the closed position when the coil is fully energized. Theuse of two adjustments for these purposes substantially eliminates performance variations that could otherwise result due to manufacturing tolerances and other variables present in a mass production assembly line.

Mechanical hysteresis is minimized with the use of bearings located at opposite axial ends of the actuator shaft. These bearings provide little resistance to the axial displacement of the actuator yet provide a relatively fixed reaction to the tendency of the actuator to move laterally from a position of alignment with the axis of the solenoid. This object is realized by forming multiple spiral slots through the thickness of the bearing discs.

A Belleville spring having a negative spring rate over the operational displacement range of the actuator is arranged in parallel with a compression spring having a positive spring constant. This combination produces an effective spring constant that is substantially invariant over the displacement range of the plunger.

BRIEF DESCRIPTION OF THE DRAWING

FIG. 2 is a top view of a spring.

FIG. 3 is a cross section taken at plane III—III of FIG. 2.

FIG. 4 is a diagram of the force vs. displacement characteristics of a spring used in the solenoid.

FIG. 5 are diagrams of the force vs. displacement characteristics for springs having positive and negative spring constants and the spring rate that results when the springs are operating in the solenoid of this invention.

FIG. 6 is a top view of a flexible bearing used to support each end of a shaft of the solenoid.

FIG. 7 is a cross section taken at a plane that contains the central axis of the solenoid.

DESCRIPTION OF THE PREFERRED EMBODIMENT

Figure 1:
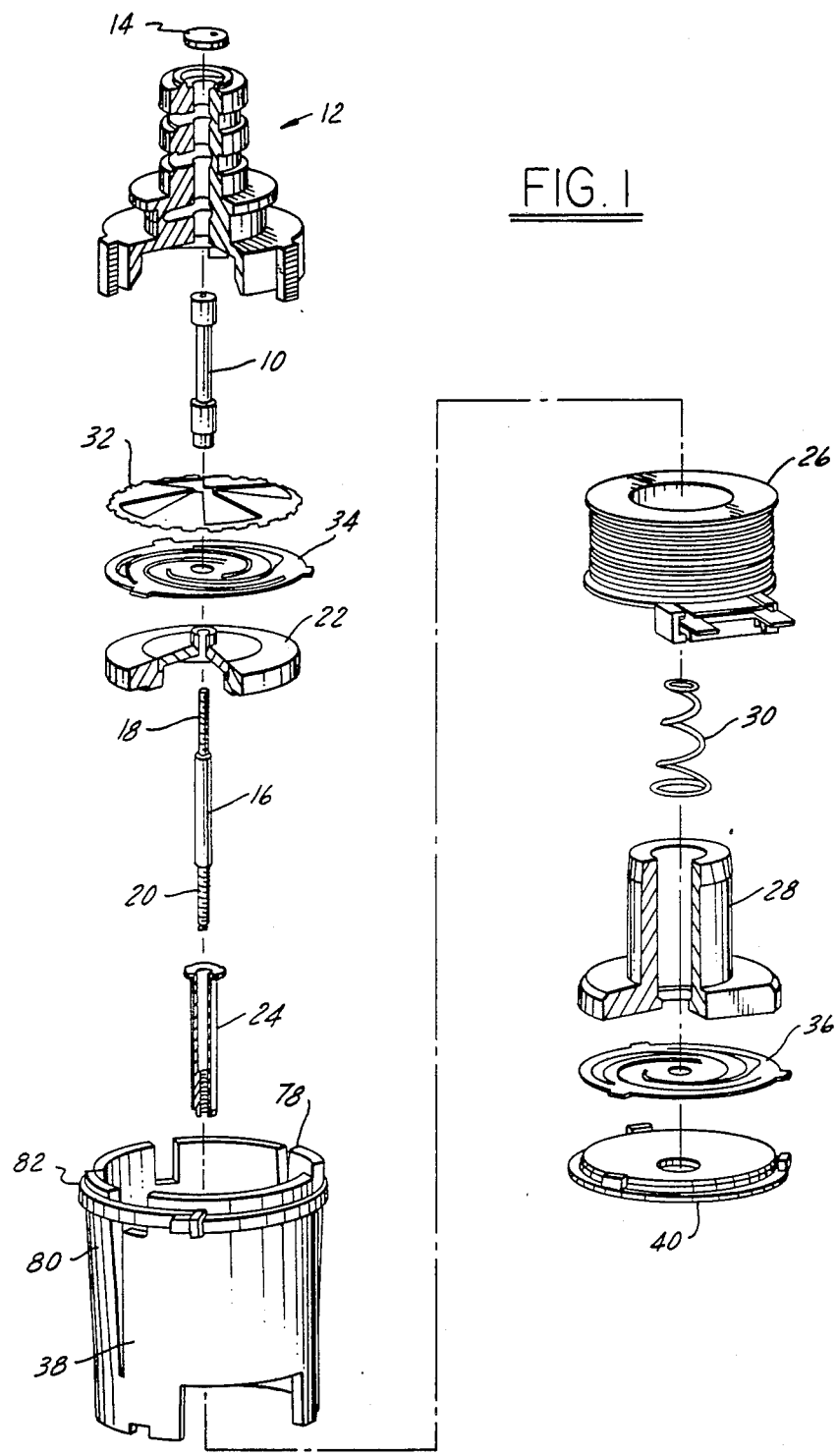
FIG. 1 is an isometric view of a solenoid according to this invention whose components are shown displaced axially with respect to each other.

Referring first to FIG. 1, the variable force solenoid according to this invention moves a valve spool 10 within the bore of a hydraulic valve 12 located at one axial end of the solenoid assembly. The bore of the valve body is closed at one end by a plastic valve stop 14 which limits the movement of the valve spool 10. A shaft actuator 16 having thread segments 18 and 20 near each opposite axial end is aligned with the valve spool and with the central axis of the assembly. The thread 18 engages an internal thread in an actuator plate or plunger 22 and the thread 20 engages an internal thread in a return spring adjuster 24.

A coil of wound conductive wire has an inside diameter sized to fit over the cylindrical portion of a coil core 28. A helical coiled return spring 30 fits within the bore of the coil core and contacts the inner surface of the flange of the return spring adjuster 24. A Belleville spring 32, located between the adjuster plate and the hydraulic valve, applies a force to the subassembly that comprises the actuator shaft and the return spring adjuster.

This assembly is supported for movement parallel to the central axis of the solenoid by an upper flexible bearing 34 and a lower flexible bearing 36, which are retained on slots provided in a housing 38 that contains the components of the solenoid and this field at the lower end by a bottom cover 40.

FIG. 7 shows the components of the solenoid-valve assembly in greater detail. In that figure, the hydraulic valve includes an inlet port 42, connected to a source of pressurized hydraulic fluid, which may be the outlet side of a pump used to pressurize the controls and actuation system of an automatic transmission. An outlet port 44 provides a passage through which hydraulic fluid at regulated line pressure is supplied to the control elements of the transmission. An exhaust port 46 is connected to the sump or reservoir of the transmission and is maintained at substantially atmospheric pressure. A feedback line 48 carries hydraulic fluid at output pressure through orifice 50 to the upper pressure surface of the valve spool 52. Valve land 54 opens bore 56 of the valve body to the exhaust port 46 when valve spool 10 moves downward from the position shown in FIG. 7. Land 52 permits hydraulic communication between input port 42 and output port 44 when the valve is in the position of FIG. 5, and closes this communication when the valve spool moves downward.

Upward and downward movement of the valve spool is determined by the position of the actuator shaft 16. The effect of spring 32, coil spring 30 and the induced magnetic forces on the actuator shaft—return spring adjuster assembly determines the position of the valve spool 10.

Regulation of the hydraulic pressure in the control circuit is explained with reference to the extremities of the range of movement of the valve spool. When the coil is de-energized and magnetic forces are absent, the combined effect of springs 30, 32 forces valve spool 10 upward against the cover 14. In this position, inlet port 42 and outlet port 44 communicate, and outlet and inlet pressures are essentially equal. As line pressure increases, the hydraulic pressure force produced on the upper surface of land 52 increases due to the effect of fluid pressure in feed line 48. This increased force operates against the net effect of the springs and forces the valve spool downward causing land 52 to close communication between inlet port 42 and outlet port 44, and land 54 to open communication between outlet port 44 and exhaust port 46. This movement causes a rapid decrease in output pressure, lowers the magnitude of the pressure force on the end of land 52 and permits the valve spool to move upward again toward contact with the stop 14, thereby reopening communication between the inlet and outlet ports.

In variable force solenoids known from the prior art, a single compression spring forces the actuating shaft and the valve spool upward to the position where the inlet and outlets are connected. As the spring moves in response to variations in flow demand, the force it applies to the actuator shaft and valve spool changes because the displacement of the valve spool changes with variations in the rate of fluid flowing through the valve. Therefore, the spring force varies with flow rate and the regulated pressure varies with the flow rate. But in the variable force solenoid according to this invention, there is provided means to compensate for pressure fluctuations as hydraulic flow rate changes. Here compression springs 30 and Belleville spring 32 apply oppositely directed forces to the actuator shaft. This combination of forces results in a nearly constant spring force to be applied to the actuating shaft within the full range of displacement of the actuator shaft.

FIGS. 2 and 3 illustrate the structure of a modified Belleville spring 32. The periphery of the ring 60 includes corrugations 62 which are used to seat the spring on the lower edge of the valve body. Extending radially inward and cantilevered from the ring are four triangular beams 64 which, in their undeflected position, extend axially above the plane that contains ring 60. The end of each of these beams is free and unconnected from any other portion of the spring; the beams define at their radially inner end a space 60 through which the actuator shaft passes. The inner end of the cantilevered beams 64 are bent into an radial plane 68 that is parallel to the plane of ring 60. When the solenoid is assembled, plane 68 rests on the upper surface of actuator 22.

FIG. 4 shows the force versis displacement diagram for the modified Belleville spring 32. The spring rate is positive when displacement is small and in the direction tending to deflect the cantilevered beams toward plane 60. As this displacement increases, the spring rate becomes nonlinear over a transition range of displacements and then becomes linear and negative over a range of displacements greater than the transition range of displacements. It is this negative spring rate that is used to compensate for the increase in force of the compression spring that results due to the displacement of the actuator shaft.

FIG. 5 shows the combined effects of compression spring 36 and Belleville spring 32. The negative spring rate and positive spring rate combine over the operating displacement range of the actuator shaft to produce an effective spring rate which is substantially constant over that range of displacement. The position of the Belleville spring as installed in the solenoid is such that, when the electrical current in coil 26 is zero, spring 32 produces only a minimum force. As the actuator shaft moves downward, the force of spring 32 increases. The operating range of the Belleville spring is illustrated in FIG. 4 where displacement B corresponds to the zero coil current position and displacement A corresponds to the maximum coil current position.

FIG. 6 shows the spiral configuration forced through the thickness of the flexible bearings 34, 36. The bearings are made from 301 stainless steel and have a thickness of approximately 0.006 in. Tangs 68 permit the bearings to be held in position on slots provided in the wall of casing 38. A circular hole 70 is located on the central axis of the solenoid and permits the threaded portion 18, at the upper end of the actuator shaft, to extend through bearing 32 and the return spring adjuster 24, at the lower end of the solenoid, to extend through bearing 36. The spiral slots 72 in the bearings substantially reduce their ability to carry load axially between the casing and the actuating shaft. Therefore, the springs have little capacity to carry other than a small fraction of the axially directed force of the actuator shaft to a reaction on the solenoid casing. However, the bearings have a relatively high in-plane stiffness and permit radially directed forces present in the actuator shaft to be reacted on the solenoid casing. The ability of bearings 32 and 36 to react radial forces maintains the axial alignment of the actuator shaft with the valve spool and the other components of the assembly that are concentric with the central axis of the solenoid. The bearings effectively eliminate sliding friction and produce very little mechanical hysteresis in the assembly.

There are two means for adjusting the axial position of the actuator and the shaft. The full scale adjustment assures that maximum pressure is produced when coil current is zero. The screw thread 20 formed at the lower end of the actuator shaft engages the thread formed on the inner surface of the return spring adjuster 24. The hexagonal head 74 permits actuator shaft 16 to be adjusted axially with respect to the position of adjuster 24. When coil 26 is de-energized, the position of shaft 16 is adjusted with respect to adjuster 24 by turning head 74 until the valve spool seats on the stop 14.

The solenoid according to this application also has a zero pressure adjustment, which assures that input passage 42 is closed by land 52 from communicating with output passage 44 and that exhaust passage 46 is permitted by the location of land 54 to communicate with output passage 44. The axial position of actuator 16 can be adjusted with respect to the position of actuator 22 by turning hex 76, located at the lower end of adjuster 24 when full current is applied to coil 26. When the adjuster is turned in this way, actuator 16 turns with adjuster 24 and screw thread 18 moves downward with respect to actuator 22. Valve 10 also moves downward and assures that the output port and exhaust port communicate and that line pressure goes to zero. Each solenoid, according to this invention, may have the zero pressure adjustment and the full-scale pressure adjustment; therefore, low cost techniques can be used to assemble this solenoid because the variations that result from manufacturing tolerances can be virtually eliminated by both the zero pressure and full pressure adjustment.

Casing 38 includes flexible tabs 78, 80 whose position is adjusted radially inward and outward by adjusting the tension on a band that surrounds the casing 38. In this way, the dimension of the nonworking air gap can be adjusted.

In order to achieve good magnetic hysteresis at low manufacturing cost, the solenoid is fabricated using low cost production techniques and the proper materials. For example, the outer cylinder is made preferably of silicon sheet steel punched and rolled into the proper shape. The actuator shaft and coil cylinder 38 are made of low carbon iron powdered metal. The sheet steel and powdered metal are fabricated without expensive secondary machining operations. Plunger 16 allows efficient use of the solenoid volume to contain the coil and minimizes the mass of the parts that move axially so that their response to force variations is rapid.

Having described a preferred embodiment of my invention, what I claim and desire to secure by U.S. Letters Patent is:

1. A solenoid comprising:
   coil means for inducing a magnetic flux when supplied with electrical current;
   an actuator supported for linear displacement;
   first spring means having a positive spring constant for applying to the actuator a force that changes as the displacement of the actuator changes from a reference position;
   second spring means having a negative spring constant over the operating range of actuator displacement for applying to the actuator a force that changes in the opposite direction and by substantially the same amount as the change of force of the first spring means as the displacement of the actuator position changes from a reference position; and
   a magnetic circuit through which the induced magnetic flux passes tending to displace the actuator in accordance with the magnitude of electrical current supplied to the coil means.

2. The solenoid of claim 1 further comprising bearing means for supporting the actuator against movement transverse to the direction of actuator displacement and for permitting relatively and substantially unrestricted displacement of the actuator in the displacement direction.

3. The solenoid of claim 1 further comprising a valve that includes:
   a valve body defining a bore therein;
   a source of pressurized fluid;
   an inlet port connecting the fluid pressure source to the valve bore;
   an outlet port connected to the valve bore for supplying fluid to a hydraulic circuit;
   an exhaust port connecting the valve bore to a relative low pressure;
   a valve element moveable within the valve bore by the actuator having means for opening and closing communication between the inlet port and the outlet port and between the outlet port and exhaust port; and
   feedback means for tending to move the valve element toward the position where communication is closed between the inlet port and outlet port.

4. The solenoid of claim 3 further comprising;
   first means for adjusting the actuator and valve element to a position where communication is open between the inlet port and outlet port and where communication is closed between the outlet port and the exhaust port while the coil means is electrically deenergized; and
   second means for adjusting the actuator and valve element to a position where communication is closed between the inlet port and outlet port and where communication is open between the outlet port and the exhaust port while the coil means is supplied with its maximum operating electrical current.

5. The solenoid of claim 3 further comprising:
   first means for adjusting the actuator to a first position where the valve is fully open; and
   second means for adjusting the actuator to a second position where the valve is fully closed.

6. The solenoid of claim 1 wherein the magnetic circuit includes:
   a plunger connected to the actuator;
   a casing surrounding the coil means, separated from the plunger by a non-working air gap whose distance from the plunger is adjustable and invariant during operation of the solenoid; and
   a core on which the coil means is located, separated from the plunger by a working air gap whose width from the plunger changes with the displacement of the actuator.

7. The solenoid of claim 6 wherein the casing includes a tab whose unadjusted position from adjacent portions of the magnetic circuit is different from the spacing between the casing and the adjacent portions of the magnetic circuit; and
   means for moving the tab with respect to the adjacent portions of the magnetic circuit.

8. The solenoid of claim 7 wherein the casing includes multiple tabs spaced angularly about the solenoid axis from one another, and whose unadjusted positions from the adjacent portions of the magnetic circuit are different from the spacing between the casing and the adjacent portions of the magnetic circuit; and
   wherein the tab moving means is a band contacting the tabs and surrounding the casing, whose length can be adjusted thereby moving the tab with respect to the adjacent portions of the magnetic circuit.

9. The solenoid of claim 1 further comprising:
first means for adjusting the actuator to a first extremity of its operating displacement range while the coil means is electrically deenergized; and
second means for adjusting the actuator to a second extremity of its operating displacement range while the coil means is supplied with its maximum operating electrical current.

10. The solenoid of claim 1 further comprising:
first and second bearings for supporting the actuator at spaced locations along its length, each bearing including a thin sheet disposed substantially transverse to the axis of the actuator, supported at its outer edge, having a hole through its thickness near its center, through which hole the actuator passes and is connected to the bearings, having means for reducing its out-of-plane bending stiffness and maintaining its in-plane axial stiffness.

11. The solenoid of claim 1 wherein
the first spring means is a helical coiled compression spring that applies to the actuator a force that increases in magnitude as the displacement of the actuator increases; and
the second spring means is a Belleville spring that applies to the actuator a force that decreases in magnitude as the displacement of the actuator increases.

12. The solenoid of claim 1 wherein:
the first spring means is a spring that applied to the actuator a force that increases in magnitude as the displacement of the actuator increases from a reference position; and
the second spring means is a spring that applies to the actuator a force that decreases in magnitude as the displacement of the actuator increases from a reference position.

13. The solenoid of claim 1 wherein the spring rate of the first and second spring means are substantially numerically equal to one another and are opposite in directional sense over the operating displacement range of the actuator.

14. A solenoid comprising:
coil means for inducing a magnetic flux when supplied with electrical current;
an actuator supported for linear displacement;
first spring means having a positive spring constant for applying to the actuator a force that changes as the displacement of the actuator changes from a reference position;
second spring means having a negative spring constant over the operating range of actuator displacement for applying to the actuator a force that changes in the opposite direction and by substantially the same amount as the change of force of the first spring means as the displacement of the actuator position changes from a reference position;
a magnetic circuit through which the induced magnetic flux passes tending to displace the actuator in accordance with the magnitude of electrical current supplied to the coil means; and
bearing means for supporting the actuator against movement transverse to the direction of actuator displacement and for permitting relative and substantially unrestricted displacement of the actuator in the displacement direction.

15. The solenoid of claim 14 further comprising:
a valve that includes:
a source of pressurized fluid;
an inlet port connecting the fluid pressure source to the valve bore;
an outlet port connected to the valve bore for supplying fluid to a hydraulic circuit;
an exhaust port connecting the valve bore to a relative low pressure;
a valve element moveable within the valve bore by the actuator having means for opening and closing communication between the inlet port and the outlet port and between the outlet port and exhaust port; and
feedback means for tending to move the valve element toward the position where communication is closed between the inlet port and outlet port.

16. The solenoid of claim 14 further comprising:
first means for adjusting the actuator to a first extremity of its operating displacement range while the coil means is electrically deenergized; and
second means for adjusting the actuator to a second extremity of its operating displacement range while the coil means is supplied with its maximum operating electrical current.

17. The solenoid of claim 14 further comprising:
a valve that includes:
a valve body defining a bore therein;
a source of pressurized fluid;
an inlet port connecting the fluid pressure source to the valve bore;
an outlet port connected to the valve bore for supplying fluid to a hydraulic circuit;
an exhaust port connecting the valve bore to a relative low pressure;
a valve element moveable within the valve bore by the actuator having means for opening and closing communication between the inlet port and the outlet port and between the outlet port and exhaust port; and
feedback means for tending to move the valve element toward the position where communication is closed between the inlet port and outlet port;
first means for adjusting the actuator to a first extremity of its operating displacement range while the coil means is electrically deenergized; and
second means for adjusting the actuator to a second extremity of its operating displacement range while the coil means is supplied with its maximum operating electrical current.

18. The solenoid of claim 14 wherein:
the first spring means is a spring that applies to the actuator a force that increases in magnitude as the displacement of the actuator increases from a reference position; and
the second spring means is a spring that applies to the actuator a force that decreases in magnitude as the displacement of the actuator increases from a reference position.

19. The solenoid of claim 18 further comprising:
a valve that includes:
a valve body defining a bore therein
a source of pressurized fluid;
an inlet port connecting the fluid pressure source to the valve bore;
an outlet bore connected to the valve bore for supplying fluid to a hydraulic circuit;
an exhaust port connecting the valve bore to a relative low pressure;
a valve element moveable within the valve bore by the actuator having means for opening and closing communication between the inlet port and the outlet port and between the outlet port and exhaust port; and
feedback means for tending to move the valve element toward the position where communication is closed between the inlet port and outlet port.

20. A solenoid comprising:
coil means for inducing a magnetic flux when supplied with electrical current;
an actuator supported for linear displacement;
first spring means having a positive spring constant for applying to the actuator a force that changes as the displacement of the actuator changes from a reference position;
second spring means having a negative spring constant over the operating range of actuator displacement for applying to the actuator a force that changes in the opposite direction and by substantially the same amount as the change of force of the first spring means as the displacement of the actuator position changes from a reference position;
a magnetic circuit through which the induced magnetic flux passes tending to displace the actuator in accordance with the magnitude of electrical current supplied to the coil means; and
a valve that includes:
a valve body defining a bore therein;
a source of pressurized fluid;
an inlet port connecting the fluid pressure source to the valve bore;
an outlet port connected to the valve bore for supplying fluid to a hydraulic circuit;
an exhaust port connecting the valve bore to a relative low pressure;
a valve element moveable within the valve bore by the actuator having means for opening the closing communication between the inlet port and the outlet port and between the outlet port and exhaust port; and
feedback means for tending to move the valve element toward the position where communication is closed between the inlet port and outlet port.

21. The solenoid of claim 23 wherein:
the first spring means is a spring that applies to the actuator a force that increases in magnitude as the displacement of the actuator increases from a reference position; and
the second spring means is a spring that applies to the actuator a force that decreases in magnitude as the displacement of the actuator increases from a reference position.

22. The solenoid of claim 15 wherein:
the first spring means is a spring that applies to the actuator a force that increases in magnitude as the displacement of the actuator increases from a reference position; and
the second spring means is a spring that applies to the actuator a force that decreases in magnitude as the displacement of the actuator increases from a reference position.

23. A solenoid comprising:
coil means for inducing a magnetic flux when supplied with electrical current;
an actuator supported for linear displacement;
first spring means having a positive spring constant for applying to the actuator a force that changes as the displacement of the actuator changes;
second spring means having a negative spring constant for applying to the actuator a force that changes as the displacement of the actuator position changes;
a magnetic circuit through which the induced magnetic flux passes tending to displace the actuator in accordance with the magnitude of electrical current supplied to the coil means;
first means for adjusting the actuator to a first extremity of its operating displacement range while the coil means is electrically deenergized; and
second means for adjusting the actuator to a second extremity of its operating displacement range while the coil means is supplied with its maximum operating electrical current.

24. The solenoid of claim 20 further comprising:
first means for adjusting the actuator to a first extremity of its operating displacement range while the coil means is electrically deenergized; and
second means for adjusting the actuator to a second extremity of its operating displacement range while the coil means is supplied with its maximum operating electrical current.

25. The solenoid of claim 21 further comprising bearing means for supporting the actuator against movement transverse to the direction of actuator displacement and for permitting relatively and substantially unrestricted displacement of the actuator in the displacement direction.

26. The solenoid of claim 21 further comprising;
a valve that includes:
a valve body defining a bore therein;
a source of pressurized fluid;
an inlet port connecting the fluid pressure source to the valve bore;
an outlet port connected to the valve bore for supplying fluid to a hydraulic circuit;
an exhaust port connecting the valve bore to a relative low pressure;
a valve element moveable within the valve bore by the actuator having means for opening and closing communication between the inlet port and the outlet port and between the outlet port and exhaust port; and
feedback means for tending to move the valve element toward the position where communication is closed between the inlet port and outlet port.

27. The solenoid of claim 26 further comprising:
bearing means for supporting the actuator against movement transverse to the direction of actuator displacement and for permitting relatively and substantially unrestricted displacement of the actuator in the displacement direction.

* * * * *